United States Patent [19]

Butti

[11] 4,108,408
[45] Aug. 22, 1978

[54] LOOPED TUBE CLAMP SUPPORT

[75] Inventor: James Paul Butti, Wadsworth, Ohio

[73] Assignee: The Babcock & Wilcox Company, New York, N.Y.

[21] Appl. No.: 583,330

[22] Filed: Jun. 3, 1975

[51] Int. Cl.² .............................................. F16L 3/22
[52] U.S. Cl. .................................. 248/68 R; 29/509; 29/522 R; 403/274
[58] Field of Search ........................ 29/509, 513, 522; 138/106; 248/68, 69, 74 R; 403/274

[56] References Cited

U.S. PATENT DOCUMENTS

| | | | |
|---|---|---|---|
| 1,028,630 | 6/1912 | Stryker et al. | 248/68 R |
| 1,915,288 | 6/1933 | Bott | 29/522 |
| 2,396,241 | 3/1946 | Besler et al. | 248/68 R |
| 2,746,110 | 5/1956 | Bedford | 248/68 R X |
| 2,823,016 | 2/1958 | Greer | 29/522 |
| 2,932,687 | 4/1960 | Cook | 248/68 R |
| 2,980,404 | 4/1961 | Anderson et al. | 248/68 R X |
| 3,080,140 | 3/1963 | Gohs et al. | 248/74 R |
| 3,404,446 | 10/1968 | Kritzer | 29/509 X |
| 3,894,706 | 7/1975 | Mizusawa | 248/68 CB |
| 3,924,676 | 12/1975 | Bennett | 248/68 CB X |

FOREIGN PATENT DOCUMENTS

| | | | |
|---|---|---|---|
| 605,213 | 10/1934 | Fed. Rep. of Germany | 248/68 R |
| 465,687 | 1/1969 | Switzerland | 248/68 R |
| 1,226,569 | 3/1971 | United Kingdom | 248/68 R |
| 1,279,522 | 6/1972 | United Kingdom | 248/68 R |

Primary Examiner—Lawrence J. Staab
Attorney, Agent, or Firm—J. M. Maguire; V. M. Fazzari; R. J. Edwards

[57] ABSTRACT

A support system and method for supporting parallel tubes. A looped tube support clamp comprising a channel base with scalloped arcuate passages for tube support, the sides of the passages forming upright tabs containing a slotted hole suitable for the passage therethrough of a tapered forming tool causing a clamping action to result on the tubes adjacent the looped tab.

4 Claims, 7 Drawing Figures

LOOPED TUBE CLAMP SUPPORT

BACKGROUND OF THE INVENTION

The present invention generally relates to the field of support systems and more specifically is concerned with tube supports in a steam generator and the like.

There are increasing needs for effective methods of supporting closely packed tubes that are subject to wear and damage from induced flow and/or mechanically induced vibrations. Such a condition exists in nuclear steam generators as well as in the more conventional apparatus used for effecting a heat transfer process.

The present state of the art shows numerous arrangements that consists of tubes that are loosely supported or are fastened to their supports using loose parts such as clamps, rivets, bolts, etc., all of which require extensive space and many of which are difficult to control. Such approaches have the additional problem that serious damage can result from such a part becoming unfastened and entrained in the flow stream.

The present invention seeks to overcome to a large extent these disadvantages of the now commonly used tube support arrangements.

SUMMARY OF THE INVENTION

The present invention is of use in the support of tubes of the type employed in heat exchangers and related equipment. The looped tube support clamp is a one piece system comprising a channel base with arcuate passages scalloped in the vertical legs for tube support. Adjacent arcuate passages have a common upright slotted tab in the planes of the vertical legs of the channel. After adjacent tubes are laid in place in the arcuate passages, a tapered forming tool is forced through the slot of the upright tab. This causes deformation of the slotted tab thus forming a loop which results in the exertion of a secure clamping action on the adjacent tubes. Such clamping of the tubes at certain intervals provides an improved support structure.

Those skilled in the art will appreciate that the present invention introduces a new and improved tube support structure displaying numerous benefits including but not limited to providing a tube support structure with no loose parts, providing a support structure that clamps the tubes tightly thus reducing relative motion between the tube and support and providing a tube support wherein the clamping action can be varied by varying the geometry of the tube, the slot and the loop forming tool.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF THE PREFERRED EMBODIMENT

Figure 1:
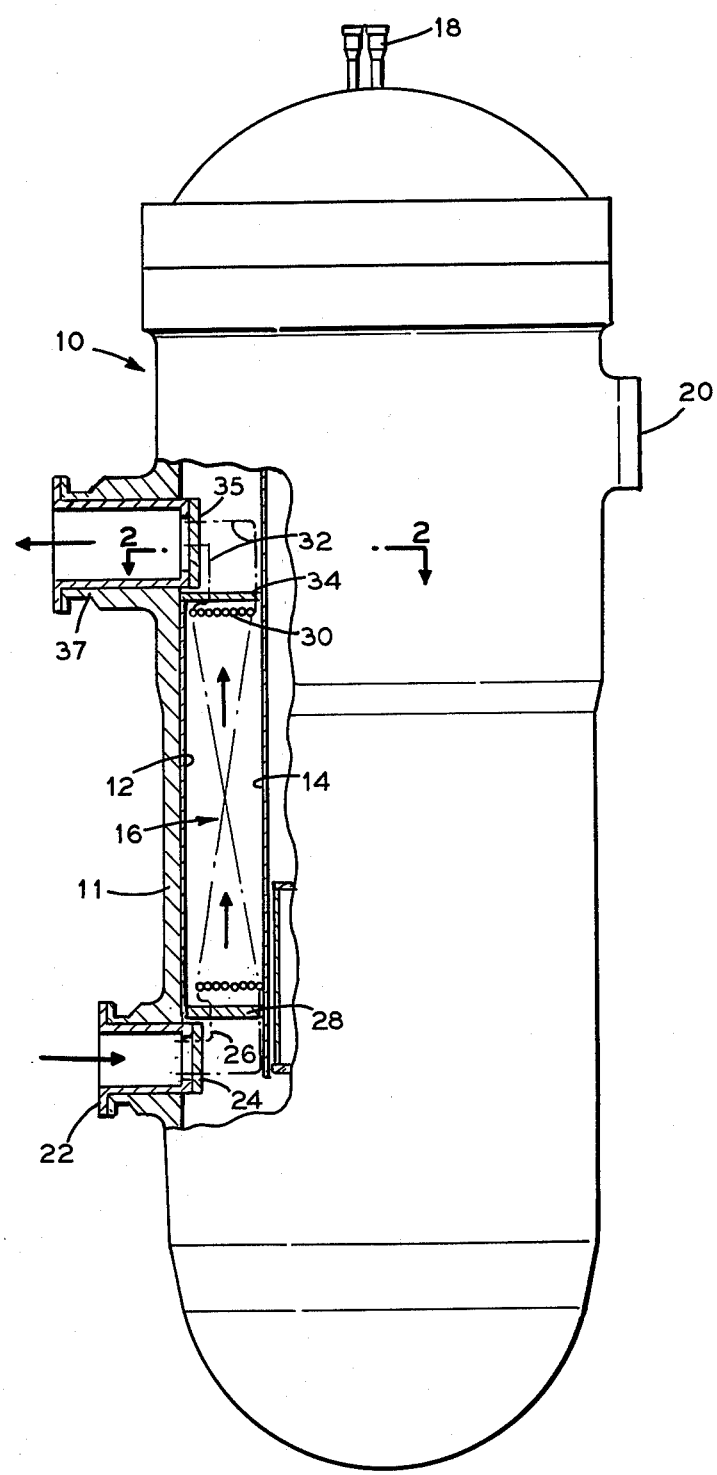
FIG. 1 is the front view of a nuclear reactor with an internal steam generator shown by a partial cutaway.

FIG. 1 generally depicts a nuclear reactor 10 with reactor vessel 11 which in conjunction with inner cylindrical shell 14 and outer cylindrical shell 12 houses steam generator 16. The partial cutaway section of FIG. 1 shows such a steam generating section. Contained within inner cylinder 14 is a nuclear core (not shown) wherein the occurrence of nuclear fission reactions result in the generation of heat. Control rod support nozzles 18 support control rods (not shown) which provide a means by which the rate of nuclear reaction is controlled. The heat generated by the reactions in the core is transferred to a recirculating primary coolant stream which may be pressurized fluid. Recirculation is achieved by use of a recirculating pump, the impeller of which is installed through pump nozzle 20. Feedwater is introduced into the secondary coolant system by a feedwater inlet 22. The feedwater is forced against lower tube sheet 24 which support "pigtails" 26 that communicate with the heat transfer conduits, bars or members 30 of the steam generator 16. The pigtails 26 are merely connecting tubes which connect the heat exchange tubes 30 to the upper or lower tube sheet. Generally, the pigtails can be arranged to avoid the necessity of passing through lower support beam 28 or upper support beam 34. The feedwater, having acquired a portion of the heat carried by the upward flowing coolant, which flows about the outer walls of the tubes, is vaporized, thus forming a steam phase. As can be appreciated, the combination of temperature, pressure, phase changes and fluid velocities can cause conditions which require the tubes 30 to be securely and reliably fastened. The steam is led via upper pigtails 32 through upper tube sheet 35 to exit the vessel through steam outlet 37.

Figure 2:
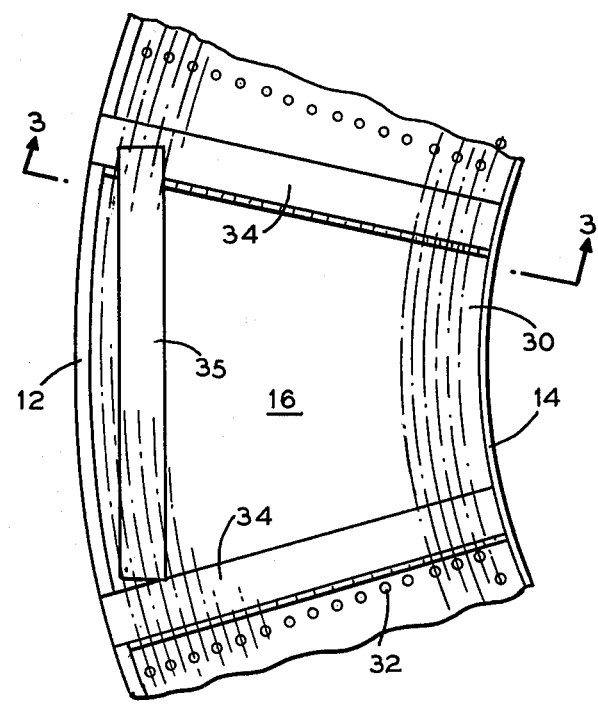
FIG. 2 is an enlarged plan view of a section of the steam generator shown in the cutaway of FIG. 1 taken along the line 2—2 of FIG. 1 and viewed in the direction of the arrows.

FIG. 2 is an enlarged plan view of a section of the steam generator shown in the cutaway of FIG. 1, along line 2—2 and viewed in the direction of the arrows. FIG. 2 only shows a portion of the generating section. The pigtails appear in FIG. 2 as circular cross sections 32. The numbers correspond to those items shown and described in FIG. 1. As is readily apparent, the transfer tubes 30, only the center lines of which are depicted in FIG. 2, may have curvature when arranged concentrically to the inner cylinder. However, the generating section can contain the maximum heat transfer area (external tube surface) and so the tubes can be arranged in a helical or winding pattern. A helical pattern is the configuration one would observe if one were to stretch a coiled spring. FIG. 2 shows a simplified plan one would see of numerous helically disposed tubes concentric with the inner cylinder 14. It is the support of these tubes, which may be of nominal ¾ inch diameter that this invention is directed to.

Figure 3:
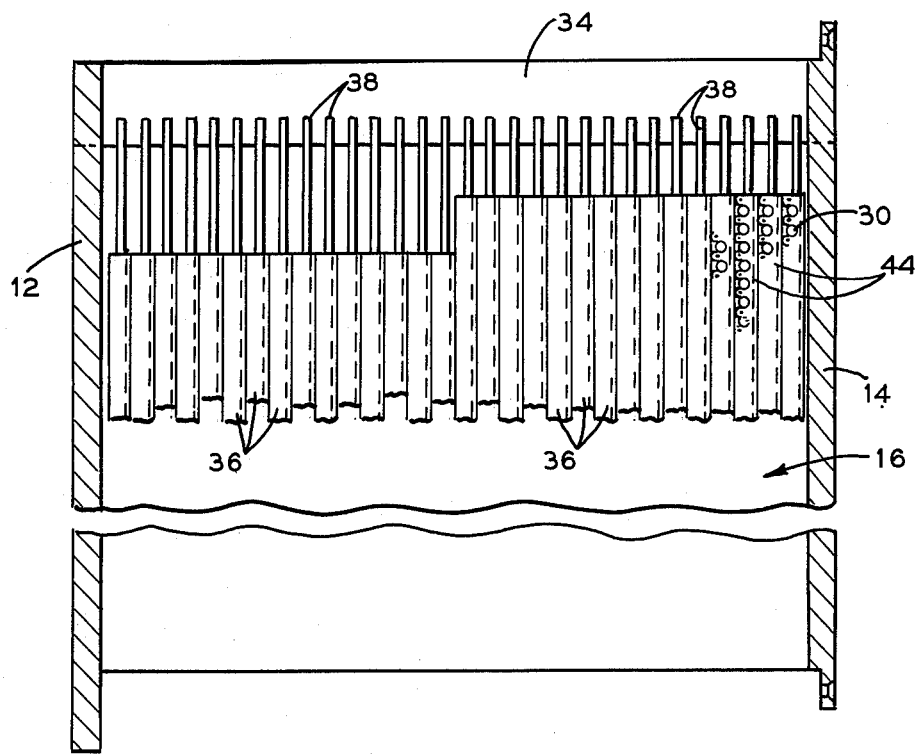
FIG. 3 shows a front view taken along line 3—3 of FIG. 2, viewed in the direction of the arrows but with the tubes and upper and lower tube sheet removed.
Figure 6:
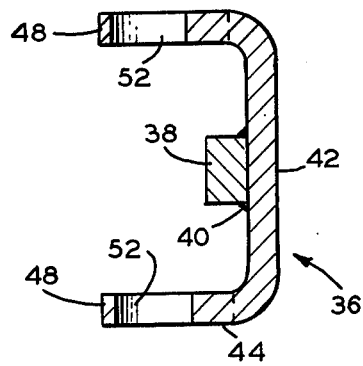
FIG. 6 is a view taken along line 6—6 of FIG. 4 and viewed in the direction of the arrows with the tubes removed.
Figure 5:
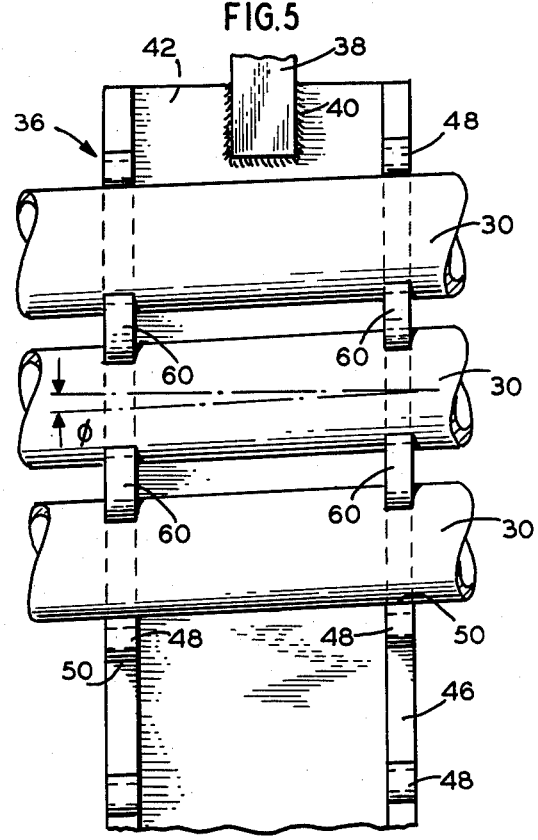
FIG. 5 is a side view of the support member of FIG. 4.
Figure 4:
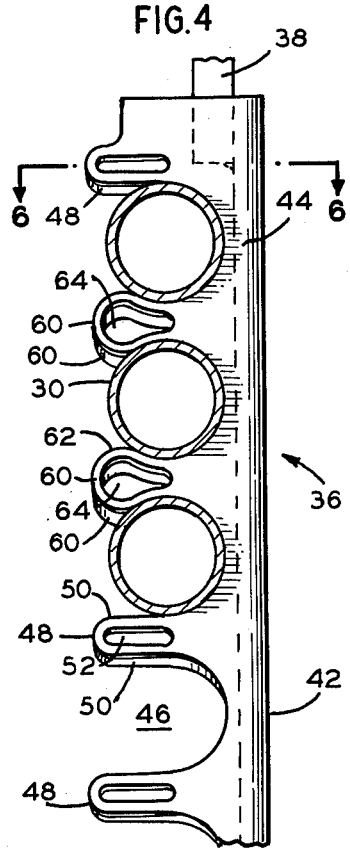
FIG. 4 is a view of a portion of the support member of FIG. 3 with one tube secured and two partially secured.

FIG. 3 is a view of the generator section of FIG. 2 taken along line 3—3 of FIG. 2, again the pigtails have been deleted for the sake of simplicity. As shown, upper support beam 34 spans the width of the generator between cylinders 12 and 14. A similar support, lower support beam 28 (FIG. 1) spans the generator at its lowermost portion. FIG. 3 shows the orientation of support member 36 within the steam generator. For purposes of clarity, a portion of the helical tubes 30, the pigtails and the upper tube sheet have been removed. The support members 36 are shown of varying lengths due to a rising winding pattern of the helical tube arrangement. In the preferred form of the invention, support member 36 is unitary and channel-like in cross section and is preferably vertically disposed with respect to the steam generator 16 when supporting horizontal tubes. Of course, support member 36 can have any structural cross section. Slight alterations would enable a horizontal disposition so as to support horizontal or vertically oriented tubes in an appropriate situation. The support member is secured to upper support beam 34 and secured in a similar manner to the lower support beam 28 (not shown) by support connecting means 38 (FIG. 3) which is secured to the beams preferably by welding. The support connecting means is preferably a solid bar and is fastened to the channel by the weld 40 (FIG. 6). The bar 38 is in connection with support member 36 for a distance of approximately one inch from the members' uppermost end as shown in FIGS. 4 and 5. FIG. 3 shows the support channels 36 to be of different lengths. One will appreciate that the stepped configuration so shown is to take into account the different elevations of the helical tubes at that point. Such difference of elevation comes about because of the different starting points of the tubes about the circumference of the generator 16. Portions of tubes 30 and legs 44 are indicated so as to allow one to appreciate the orientation of support member 36.

FIG. 4 shows the upper portion of support member 36 with one tube secured in place and the two adjacent tubes only partially secured. As previously mentioned, the preferred embodiment of the support clamp is a channel-like member. The member consists of a base 42 with legs 44 (FIG. 6) substantially perpendicular to the base. Passages 46, substantially identical but slightly larger in dimension than a portion of the outer surface of the tube are scalloped out of the legs. The passages need not be carved out of the legs as far down as the base but such may be the practice if the situation so warrants. In the preferred embodiment, the passages are arcuate in section, the lower end of which is slightly spatially displaced from the base 42. The arcuate passage is actually semicircular with a protruding slotted tab 48 being formed by a tangent section common to adjacent arcuate passages extending substantially perpendicular from base 42. The tab is longer than it is wide and is formed by outer legs 50 which are extensions of legs 44 tangential to the arcuate passages 46. Each tube 30 will have a tab on both its sides. Each tab will be substantially the same overall height. The slotted opening 52 of the tab has its lower portion located at about the center line of the tube or conduit. The upper portion of the opening is located at least at the same height as the top section of the tube or conduit. Of course, the tube or conduit or bar should fit firmly into the passage 46 before the securing action is produced.

FIG. 5 shows a side view of support 36 relative to FIG. 4. The channel-like arrangement of the support is more clearly reflected in FIG. 5 as well as the location and attachment of connecting bar 38 to base 42.

When dealing with tubes that are helical in pattern, the passages in respective legs of the channel-like member have center lines displaced from one another by an angle $\phi$ (FIG. 5). When dealing with the tubes arranged in a helical pattern, the displacement angle $\phi$ will be determined by the "pitch". When dealing with horizontal banks of tubes, the arcuate passages may be varied to take into account the curvature of the tube section over the width of the channel.

FIG. 6, which is a view along line 6—6 of FIG. 4, but with the tubes removed, also indicates the channel-like pattern of the support 36 and more clearly reflects the spatial relation of the base 42 to the legs 44.

Figure 7:
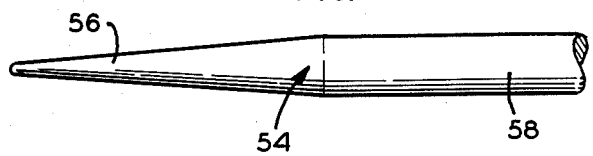
FIG. 7 shows a tool useful in the practice of this present invention.

FIG. 7 shows a hardened pin 54 used in installing the tubes in the present invention. The pin 54 has a long conical tapered section 56 which transitions to the pin diameter in the main shaft 58.

In the practice of the invention, the tubes are laid in the passages in a pattern so that the tube to be secured has tubes occupying the adjacent passages. The tapered tool 54 of FIG. 7 is forced through slot 52. The tool has a tapered section 56 which goes from a diameter smaller than the width of slot 52 to a straight section 58 of diameter slightly larger than the width of slot 52. The tool may be forced through the opening 52 by pliers or by hammer or any other suitable means. The tool distorts the slot causing legs 50 to be bent outwardly thus embracing the adjacent tubes. Because the adjacent tubes fit firmly into the passages, the distortion naturally occurs at the upper part of the opening, the result being that the upper portion of the opening expands so as to allow the tool to pass through, thus forming a loop 60 which in part follows the contour of the adjacent tubes. The distortion of the ductile material brings about tensile and compressive forces in various parts of the legs 44, outer legs 62 and loop 60, resulting in loop opening 64 and the necessary clamping forces being exerted on tube 30 so as to reliably secure the same. Of course, the tube must be of a material and thickness to withstand the compressing clamping forces without itself experiencing a permanent distortion. Also, the material from which the protruding tab is constructed must be ductile in nature. As will be appreciated, control of the clamping action can be determined by the dimensions, geometry, material and thickness of the tabs as well as the dimensions and shape of the tool that forms the loops. In utilizing the support system herein described, one will appreciate that in determining support locations and spacings to prevent excessive tube deflections and vibrations, one must take into account the following variables of the system: fixity of the tube in the support, tube material, size and thickness, drag, vibration and other forces that are imposed upon the tube by the fluids that are flowing in and around the tubes, and by forces that are imposed by the supports through the attaching equipment.

By way of example only, a tube support system as described herein was fabricated to support a ¾ inch outside diameter (O.D.) tube with a 0.071 inch wall thickness. The tube material was Inconel. The support was fashioned from 304 Stainless Steel (S.S.) 3/16 inches thick. The arcuate passages had a diameter of 0.760 inches and adjacent arcuate passages were located on 1 inch center lines. The depth of the support, that is distance between legs 44 was approximately 2 inches. The opening 52 was in the form of a slot with ⅛ inch width and a length slightly in excess of ⅝ of an inch. The thickness of outer legs 50 was approximately 1/16 inches. The uppermost part of the tab 48 extended above the tube by approximately ⅛ inch. The installation tools consisted of common slip joint water pump type pliers and a ¼ inch diameter 58, hardened pin 54 with a long taper at its leading end. Upon forcing the tool 54 through the slotted opening 52 a loop 60 was formed resulting in a clamping action of tubes 30. The tubes were found to be so securely fastened, that they could not be budged without the aid of tools.

As may be appreciated, the vessel of FIG. 1 may contain a number of independent steam generating units. In such a situation, each independent generating section may have its own feedwater inlet and steam outlet as well as independent transfer tubes, tube sheets, support beams and pigtails. As in the single generator arrangement the tube pattern may be helical, serpentine, vertical or horizontal.

The embodiments of the invention in which an exclusive property or privilege is claimed are defined as follows:

1. A spacer and support device for a heat exchanger having tube portions extending substantically parallel to each other, the device comprising a section formed with recesses to support and space the tube portions and with tabs disposed intermediate the recesses, each tab being formed with an enclosed aperture configuration, the enclosed aperture of each tab being slot like when its corresponding tube portions are set in place in corresponding recesses and adapted to be forcibly deformed to clamp its corresponding tube portions in place while maintaining the enclosed configuration of the aperture.

2. A spacer and support device as in claim 1 wherein the section is a unitary structure.

3. A spacer and support device as in claim 1 wherein the section is a channel.

4. A spacer and support device as in claim 1 wherein the tabs are arranged to form arcuate passageways.

* * * * *

UNITED STATES PATENT AND TRADEMARK OFFICE
CERTIFICATE OF CORRECTION

PATENT NO. : 4,108,408
DATED : August 22, 1978
INVENTOR(S) : James Paul Butti

It is certified that error appears in the above-identified patent and that said Letters Patent are hereby corrected as shown below:

Column 5, line 3, "7/8" should read --3/8--.

Signed and Sealed this

Eighteenth Day of December 1979

[SEAL]

Attest:

SIDNEY A. DIAMOND

Attesting Officer     Commissioner of Patents and Trademarks